United States Patent
Shimamura et al.

(10) Patent No.: US 9,192,862 B2
(45) Date of Patent: Nov. 24, 2015

(54) INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

(71) Applicant: NINTENDO CO., LTD., Kyoto (JP)

(72) Inventors: Takayuki Shimamura, Kyoto (JP); Ryunosuke Suzuki, Kyoto (JP); Kozo Makino, Kyoto (JP); Masatoshi Kawada, Tokyo (JP)

(73) Assignee: NINTENDO CO., LTD., Kyoto (JP)

(*) Notice: Subject to any disclaimer, the term of this patent is extended or adjusted under 35 U.S.C. 154(b) by 107 days.

(21) Appl. No.: 14/146,333

(22) Filed: Jan. 2, 2014

(65) Prior Publication Data
US 2015/0109185 A1 Apr. 23, 2015

(30) Foreign Application Priority Data
Oct. 22, 2013 (JP) .................. 2013-219265

(51) Int. Cl.
G09G 5/00 (2006.01)
A63F 13/31 (2014.01)
G06F 3/14 (2006.01)
A63F 13/25 (2014.01)

(52) U.S. Cl.
CPC ................ *A63F 13/31* (2014.09); *A63F 13/25* (2014.09); *G06F 3/1415* (2013.01)

(58) Field of Classification Search
CPC ..... G06F 5/06; G06F 2201/875; A63F 13/00; A63F 13/06; A63F 13/12; A63F 13/25; A63F 13/31; A63F 13/32; A63F 13/327; A63F 13/33; A63F 13/332; A63F 13/335; A63F 13/55; A63F 13/573; A63F 2300/402; A63F 2300/404; A63F 2300/408; A63F 2300/55; A63F 3/14; A63F 9/24; H04N 21/436

See application file for complete search history.

(56) References Cited

U.S. PATENT DOCUMENTS

| | | | | |
|---|---|---|---|---|
| 6,155,926 | A * | 12/2000 | Miyamoto et al. | 463/32 |
| 6,244,959 | B1 * | 6/2001 | Miyamoto et al. | 463/31 |
| 6,597,739 | B1 * | 7/2003 | Li et al. | 375/240.19 |
| 7,976,380 | B2 * | 7/2011 | Itagaki | 463/23 |
| 2006/0056509 | A1 * | 3/2006 | Suino et al. | 375/240.11 |
| 2007/0078004 | A1 | 4/2007 | Suzuki et al. | |
| 2010/0088604 | A1 * | 4/2010 | Miura et al. | 715/727 |
| 2011/0013879 | A1 * | 1/2011 | Osawa et al. | 386/228 |
| 2011/0216046 | A1 * | 9/2011 | Nishizawa | 345/204 |
| 2012/0005628 | A1 * | 1/2012 | Isozu et al. | 715/838 |
| 2012/0022373 | A1 * | 1/2012 | Tateyama | 600/437 |

FOREIGN PATENT DOCUMENTS

JP 2007-097837 4/2007

\* cited by examiner

*Primary Examiner* — Joe H Cheng
(74) *Attorney, Agent, or Firm* — Nixon & Vanderhye PC

(57) ABSTRACT

An apparatus capable of communicating with another apparatus includes a display control unit configured to display, for a time longer than normal, a plurality of drawing frames forming images that are to be displayed after transmission of predetermined input data and are based on a user input, and/or a display control unit configured to display, for a time shorter than normal, a plurality of drawing frames forming images that are to be displayed after reception of predetermined input data and are based on input data.

28 Claims, 7 Drawing Sheets

SCREEN DISPLAYED IN INFORMATION PROCESSING APPARATUS 3a

SCREEN DISPLAYED IN INFORMATION PROCESSING APPARATUS 3b

INFORMATION PROCESSING SYSTEM, INFORMATION PROCESSING APPARATUS, STORAGE MEDIUM HAVING STORED THEREIN INFORMATION PROCESSING PROGRAM, AND INFORMATION PROCESSING METHOD

CROSS REFERENCE TO RELATED APPLICATION

The disclosure of Japanese Patent Application No. 2013-219265, filed on Oct. 22, 2013, is incorporated herein by reference.

FIELD

The technology shown here relates to an information processing system, an information processing apparatus, an information processing method, and a storage medium having stored therein an information processing program, and in particular, relates to an information processing system, an information processing apparatus, and an information processing method in which, for example, apparatuses transmit and receive data to and from each other, and a storage medium having stored therein an information processing program in which, for example, apparatuses transmit and receive data to and from each other.

BACKGROUND AND SUMMARY

Conventionally, there is a game system in which a game is performed using a plurality of game apparatuses via a communication network.

When, however, a plurality of game apparatuses perform data communication via a communication network, a delay time for transmitting and receiving the data is caused depending on the communication environment. If a delay time is caused when such data is transmitted and received, a delay is caused also in a game performed using the apparatuses transmitting and receiving the data. This makes it difficult to advance the game while synchronizing it.

Therefore, it is an object of an exemplary embodiment to provide an information processing system, an information processing apparatus, and an information processing method that deal with a delay to be caused when apparatuses transmit and receive data to and from each other, and a storage medium having stored therein an information processing program that deals with a delay to be caused when apparatuses transmit and receive data to and from each other.

To achieve the above object, the exemplary embodiment can employ, for example, the following configurations. It should be noted that it is understood that, to interpret the descriptions of the claims, the scope of the claims should be interpreted only by the descriptions of the claims. If there is a conflict between the descriptions of the claims and the descriptions of the specification, the descriptions of the claims take precedence.

An exemplary configuration of an information processing system according to an exemplary embodiment includes at least a first information processing apparatus and a second information processing apparatus capable of communicating with the first information processing apparatus. The first information processing apparatus includes a first input acquisition unit, a first image display control unit, and a first input data transmission unit. The first input acquisition unit acquires a user input provided to the first information processing apparatus. The first image display control unit displays on a first display screen an image based on the user input. The first input data transmission unit configured to transmit, to the second information processing apparatus, input data representing the user input. The second information processing apparatus includes a second input data reception unit and a second image display control unit. The second input data reception unit receives the input data transmitted from the first information processing apparatus. The second image display control unit displays on a second display screen an image based on the input data received by the second input data reception unit. Then, the first image display control unit includes a low-speed display control unit, and/or the second image display control unit includes a high-speed display control unit. The low-speed display control unit displays, for a time longer than normal, a plurality of drawing frames forming images that are to be displayed after transmission of predetermined input data and are based on the user input. The high-speed display control unit displays, for a time shorter than normal, a plurality of drawing frames forming images that are to be displayed after reception of the predetermined input data and are based on the input data.

Based on the above, an apparatus that transmits input data performs display for a time longer than normal after having transmitted predetermined input data, and/or an apparatus that receives input data performs display for a time shorter than normal after having received predetermined input data. This makes it possible to absorb a delay time to be caused when the apparatuses transmit and receive data to and from each other.

In addition, the low-speed display control unit may perform drawling display of the plurality of drawing frames, thereby displaying the plurality of drawing frames for a time longer than normal.

Based on the above, drawing frames are subjected to drawling display. This makes it possible to display the drawing frames for a time longer than normal.

In addition, the low-speed display control unit may perform the drawling display by duplicating at least one of the plurality of drawing frames at a different time.

Based on the above, the same drawing frame is displayed in a duplicated manner. This can facilitate the drawling display.

In addition, the high-speed display control unit may perform thinning display of the plurality of drawing frames, thereby displaying the plurality of drawing frames for a time shorter than normal.

Based on the above, drawing frames are subjected to thinning display. This makes it possible to display the drawing frames for a time shorter than normal.

In addition, the high-speed display control unit may perform the thinning display by dropping at least one of the plurality of drawing frames.

Based on the above, drawing frames are dropped. This can facilitate the thinning display.

In addition, the second information processing apparatus may further include a second input acquisition unit and a second input data transmission unit. The second input acquisition unit, after the reception of the predetermined input data, receives and acquires a user input provided to the second information processing apparatus. The second input data transmission unit transmits, to the first information processing apparatus, input data representing the user input provided to the second information processing apparatus. In this case, the second image display control unit may display on the second display screen an image based on the user input provided to the second information processing apparatus. Further, the first information processing apparatus may further include a first input data reception unit. The first input data reception unit receives the input data transmitted from the second information processing apparatus. In this case, the first image display control unit may display on the first display screen an image based on the input data received by the first input data reception unit. The low-speed display control unit may display a plurality of drawing frames on the first display screen for a time longer than normal during a period from transmission of predetermined input data of the first information processing apparatus to reception of predetermined input data of the second information processing apparatus. The high-speed display control unit may display a plurality of drawing frames on the second display screen for a time shorter than normal during a period from reception of the predetermined input data of the first information processing apparatus to transmission of the predetermined input data of the second information processing apparatus.

Based on the above, display is performed for a time longer than normal during the period from the transmission of predetermined input data to the reception of predetermined input data of another apparatus, and/or display is performed for a time shorter than normal during the period from the reception of predetermined input data to the transmission of predetermined input data to another apparatus. This makes it possible to absorb a delay time while displaying an image without providing a sense of discomfort.

In addition, the low-speed display control unit may display the plurality of drawing frames on the first display screen during the period from the transmission of the predetermined input data of the first information processing apparatus to the reception of the predetermined input data of the second information processing apparatus, for a time longer than normal by performing drawling display of the plurality of drawing frames at regular intervals during the period. The high-speed display control unit may display the plurality of drawing frames on the second display screen during the period from the reception of the predetermined input data of the first information processing apparatus to the transmission of the predetermined input data of the second information processing apparatus, for a time shorter than normal by performing thinning display of the plurality of drawing frames at regular intervals during the period.

Based on the above, it is possible to set the interval for performing drawling display and/or the interval for performing thinning display to be relatively long.

In addition, the low-speed display control unit may display the plurality of drawing frames on the first display screen after the transmission of the predetermined input data of the first information processing apparatus, for a time longer than normal by performing drawling display of the plurality of drawing frames after the transmission at an interval determined in advance. The high-speed display control unit may display the plurality of drawing frames on the second display screen after the reception of the predetermined input data of the first information processing apparatus, for a time shorter than normal by performing thinning display of the plurality of drawing frames after the reception at an interval determined in advance.

Based on the above, in the period in which drawling display is performed, the time to complete the drawling display early can be adjusted, and/or in the period in which thinning display is performed, the time to complete the thinning display early can be adjusted. By setting the interval for performing drawling display and/or the interval for performing thinning display are set to be relatively short, it is possible to complete the drawling display and/or the thinning display early in the periods.

In addition, the first information processing apparatus and/or the second information processing apparatus may further include a delay time measurement unit. The delay time measurement unit measures a delay time to be caused when the first information processing apparatus and the second information processing apparatus transmit and receive data to and from each other. In this case, the low-speed display control unit may display the plurality of drawing frames on the first display screen after the transmission of the predetermined input data of the first information processing apparatus, for a time longer than normal on the basis of the delay time. The high-speed display control unit may display the plurality of drawing frames on the second display screen after the reception of the predetermined input data of the first information processing apparatus, for a time shorter than normal on the basis of the delay time.

Based on the above, in accordance with an actual delay time to be caused by the transmission and reception of data, it is possible to perform display for a time longer than normal and/or a time shorter than normal.

In addition, the delay time measurement unit may measure the delay time before the input data is transmitted and received. After the transmission of the predetermined input data of the first information processing apparatus to the second information processing apparatus, the low-speed display control unit may display the plurality of drawing frames for a time longer than normal each time on the basis of the delay time measured before the input data is transmitted and received. After the second information processing apparatus has received the predetermined input data of the first information processing apparatus, the high-speed display control unit displays the plurality of drawing frames for a time shorter than normal each time on the basis of the delay time measured before the input data is transmitted and received.

Based on the above, a delay time measured before input data is transmitted and received is used in a fixed manner in the subsequent processing. This reduces the load of the processing.

In addition, if the delay time is equal to or greater than a predetermined time, the low-speed display control unit may display the plurality of drawing frames for a time longer than normal. If the delay time is equal to or greater than a predetermined time, the high-speed display control unit may display the plurality of drawing frames for a time shorter than normal.

Based on the above, only when a delay time is equal to or greater than a predetermined time, display is performed for a time shorter than normal and/or a time shorter than normal. This makes it possible to deal with a delay time where necessary.

In addition, the low-speed display control unit may display the plurality of drawing frames on the first display screen after the transmission of the predetermined input data of the first information processing apparatus, for a time longer than normal by performing drawling display of the plurality of drawing frames a predetermined number of times and at a predetermined interval after the transmission. The high-speed display control unit may display the plurality of drawing frames on the second display screen after the reception of the predetermined input data of the first information processing apparatus, for a time shorter than normal by performing thinning display of the plurality of drawing frames the predetermined number of times and at the predetermined interval after the reception.

Based on the above, drawling display and/or thinning display are performed at the same interval and performed the same number of times. This can facilitate the control of the drawling display and/or the thinning display.

In addition, the first input data transmission unit may transmit the input data to the second information processing apparatus using long-distance communication via a network. The second input data reception unit may receive the input data transmitted from the first information processing apparatus using long-distance communication via a network.

Based on the above, it is possible to make effective use of the exemplary embodiment in a communication environment where a delay time is relatively long.

In addition, the first information processing apparatus may further include a first object action determination unit. The first object action determination unit, in accordance with a predetermined user input provided to the first information processing apparatus, determines an action to be taken by a predetermined object after the predetermined user input is provided. In this case, the low-speed display control unit may display, for a time longer than normal, a plurality of drawing frames representing a successive action to be taken by the object after the predetermined user input is provided. Further, the second information processing apparatus may further include a second object action determination unit. The second object action determination unit, in accordance with predetermined input data received from the first information processing apparatus, determines an action to be taken by the object after the predetermined input data is received. In this case, the high-speed display control unit may display, for a time shorter than normal, a plurality of drawing frames representing a successive action to be taken by the object after the predetermined input data is received.

Based on the above, it is possible to make effective use of the exemplary embodiment in the process of determining a successive action of an object in accordance with a predetermined user input.

In addition, if the reception of the predetermined input data has been delayed, the second object action determination unit may temporarily stop the action of the object, and wait for the reception of the predetermined input data, thereby determining an action to be taken by the object after the reception of the predetermined input data.

Based on the above, even if a delay in the transmission of input data is great, the adjustment of the action of the object enables the synchronization of the action.

In addition, the exemplary embodiment may be implemented in the forms of an information processing apparatus including the above units, a storage medium having stored therein an information processing program causing a computer to execute the operations of the above units, and an information processing method including the operations to be performed by the above units.

Based on the exemplary embodiment, an apparatus that transmits input data performs display for a time longer than normal after having transmitted predetermined input data, and/or an apparatus that receives input data performs display for a time shorter than normal after having received predetermined input data. This makes it possible to absorb a delay time to be caused when the apparatuses transmit and receive data to and from each other.

These and other objects, features, aspects and advantages of the exemplary embodiments will become more apparent from the following detailed description of the exemplary embodiments when taken in conjunction with the accompanying drawings.

DETAILED DESCRIPTION OF NON-LIMITING EXAMPLE EMBODIMENTS

Figure 1:
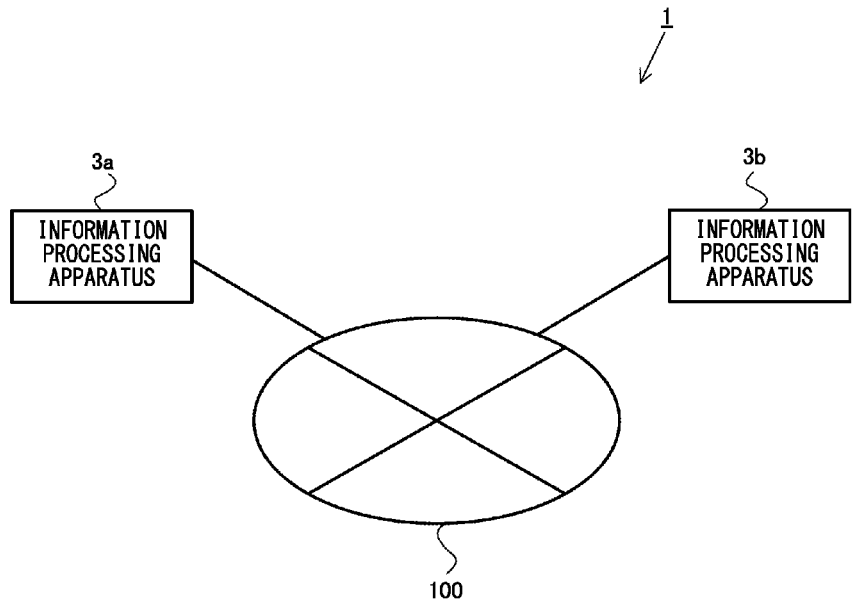
FIG. 1 is a diagram illustrating a non-limiting example of an information processing system 1.

With reference to FIG. 1, an information processing system according to an exemplary embodiment is described. As shown in FIG. 1, a display control system 1 is constructed by the connection between a plurality of information processing apparatuses 3 (information processing apparatuses 3a and 3b in the example shown in FIG. 1) via a network 100.

Each information processing apparatus 3 is configured to be connected to the network 100 using wired or wireless communication. Then, the information processing apparatus 3 establishes connection with another one of the information processing apparatuses 3 via the network 100, and thereby can perform predetermined information processing (for example, game processing) with the other information processing apparatus 3. For example, the information processing apparatus 3 can execute an information processing program stored in a storage medium such as an exchangeable memory card or an exchangeable optical disk, or received from a server or another apparatus. The information processing apparatus 3 may be a stationary game apparatus or a handheld game apparatus, or may be a device such as a general personal computer, a mobile phone, or a PDA (Personal Digital Assistant).

Figure 2:
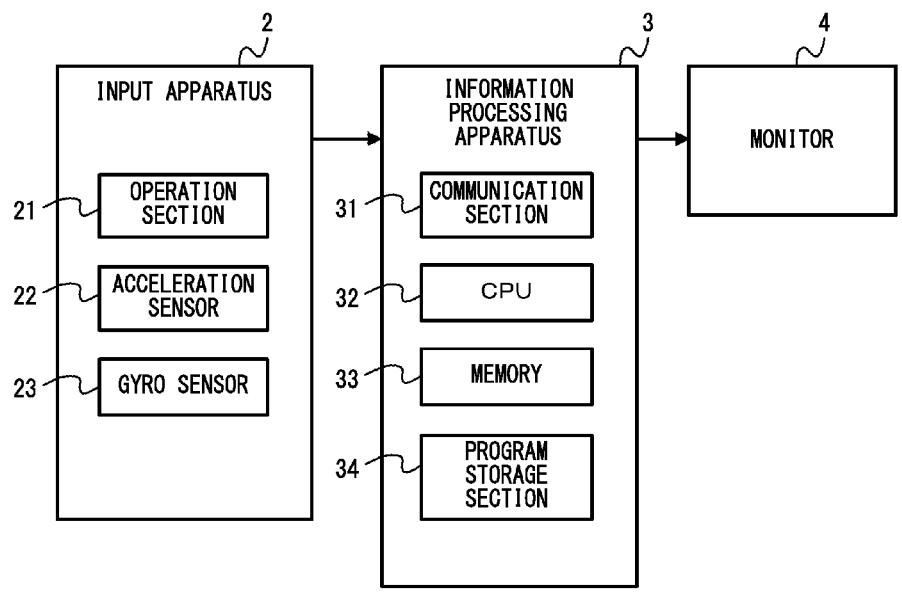
FIG. 2 is a block diagram showing a non-limiting example of the configurations of an information processing apparatus 3 in FIG. 1 and apparatuses connected to the information processing apparatus 3.

Next, with reference to FIG. 2, the information processing apparatus 3 is described. It should be noted that FIG. 2 is a block diagram showing examples of the configurations of the information processing apparatus 3 and apparatuses connected to the information processing apparatus 3.

As an example, the information processing apparatus 3 is connected to an input apparatus 2 and a monitor 4. It should be noted that the information processing apparatus 3 may be connected to the input apparatus 2 or the monitor 4 using wired or wireless communication. The information processing apparatus 3 according to the exemplary embodiment executes information processing (for example, game processing described later) in accordance with an operation on the input apparatus 2.

The input apparatus 2 includes an operation section 21, an acceleration sensor 22, and a gyro sensor 23. The operation section 21 is an input section that can be operated by a user. The operation section 21 includes an operation button, a stick that allows the input of a direction, a touch panel, a touch pad, and the like. The acceleration sensor 22 detects the accelerations generated in the input apparatus 2. As an example, the acceleration sensor 22 detects the accelerations generated in three predetermined axial directions, or the accelerations generated in one or two predetermined axial directions. The gyro sensor 23 detects the angular velocities of the input apparatus 2. As an example, the gyro sensor 23 detects the angular velocities about three predetermined axes, the angular velocity about one predetermined axis, or the angular velocities about two predetermined axes. The input apparatus 2 may include any sensor (an orientation sensor) that allows the calculation (estimation) of the orientation of the input apparatus 2 using the detection results. For example, the input apparatus 2 may include a magnetic sensor in addition to (or instead of) and the acceleration sensor 22 and the gyro sensor 23.

The input apparatus 2 detects an operation performed by the user, and transmits operation data representing the operation of the user to the information processing apparatus 3. For example, the operation data includes operation information regarding an operation on the operation section 21 (for example, press information regarding the pressing of the operation button), and acceleration information of the acceleration sensor 22 and/or angular velocity information of the gyro sensor 23, Here, the operation information indicates the state of the operation on the operation section 21 (for example, the press information indicates the state of whether or not the operation button has been pressed). Further, the acceleration information indicates the accelerations detected by the acceleration sensor 22. Further, the angular velocity information indicates the angular velocities detected by the gyro sensor 23.

The information processing apparatus 3 includes a communication section 31, a CPU 32, a memory 33, and a program storage section 34. It should be noted that the information processing apparatus 3 may include one or more apparatuses containing: an information processing apparatus having at least the CPU 32; and another apparatus. The information processing apparatus 3 may be configured in any manner to execute information processing. For example, a part or all of information processing may be executed by a dedicated circuit. In the exemplary embodiment, the information processing apparatus 3 generates an image by performing the above information processing, and the generated image is output from the information processing apparatus 3 to the monitor 4.

The communication section 31 has the function of performing wired or wireless communication with another device or the like. For example, the communication section 31 transmits and receives communication data (for example, operation data), thereby communicating with the other information processing apparatus 3 or the like via the network 100.

The CPU 32 is an example of information processing means (a computer) for performing various types of information processing. The CPU 32 has the function of, as the various types of information processing, executing processing based on an operation on the operation section 21, and the like. Further, the CPU 32 has the function of, as the various types of information processing, receiving communication data from the other information processing apparatus 3 via the communication section 31, and executing processing based on the communication data, and the like. Further, the CPU 32 has the function of, as the various types of information processing, executing the process of creating transmission data to be transmitted to the other information processing apparatus 3, and transmitting the transmission data to the other information processing apparatus 3 via the communication section 31, and the like. For example, the above functions are achieved by the CPU 32 executing a predetermined program.

The memory 33 stores various types of data for use when the CPU 32 performs the above information processing. The memory 33 is, for example, a memory accessible by the CPU 32.

The program storage section 34 stores a program. The program storage section 34 may be any storage device (storage medium) accessible by the CPU 32. For example, the program storage section 34 may be a storage device provided in the information processing apparatus 3 having the CPU 32, or may be a storage medium detachably attached to the information processing apparatus 3 having the CPU 32. Alternatively, the program storage section 34 may be a storage device (a server or the like) connected to the CPU 32 via a network. The CPU 32 may read a part or all of the program to the memory 33 at appropriate timing and execute the read program.

The monitor 4 is an example of a display apparatus for displaying, an image. When an image is transmitted from the information processing apparatus 3 to the monitor 4, the monitor 4 displays the image.

Figure 3A:
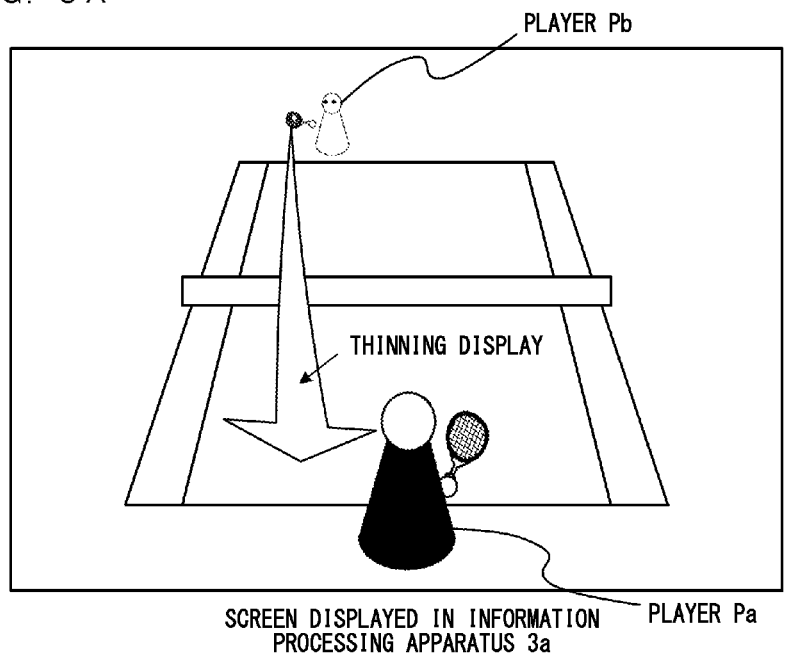
FIGS. 3A and 3B are diagrams showing non-limiting examples of screens displayed in information processing apparatuses 3a and 3b included in the information processing system 1.
Figure 3B:
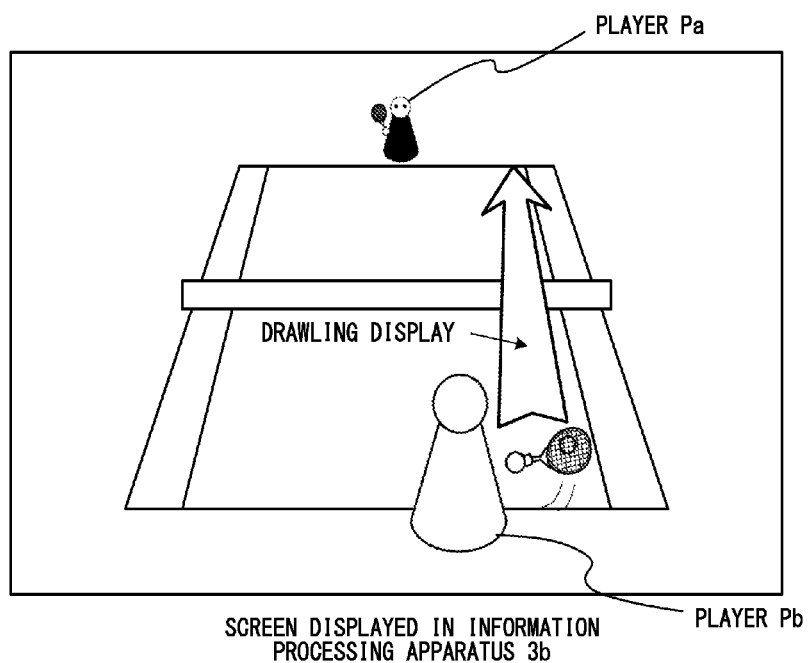
Figure 4:
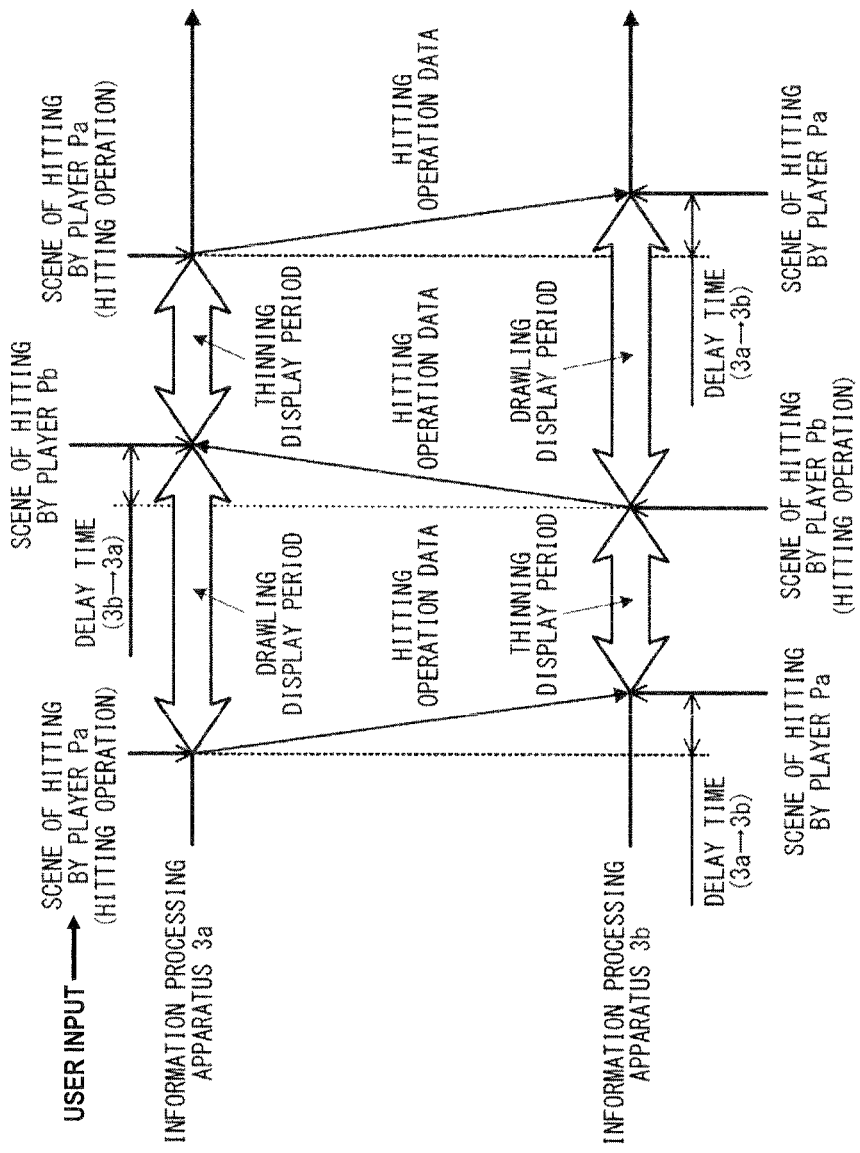
FIG. 4 is a diagram showing non-limiting examples of the processing operations of the information processing apparatuses 3a and 3b.
Figure 5:
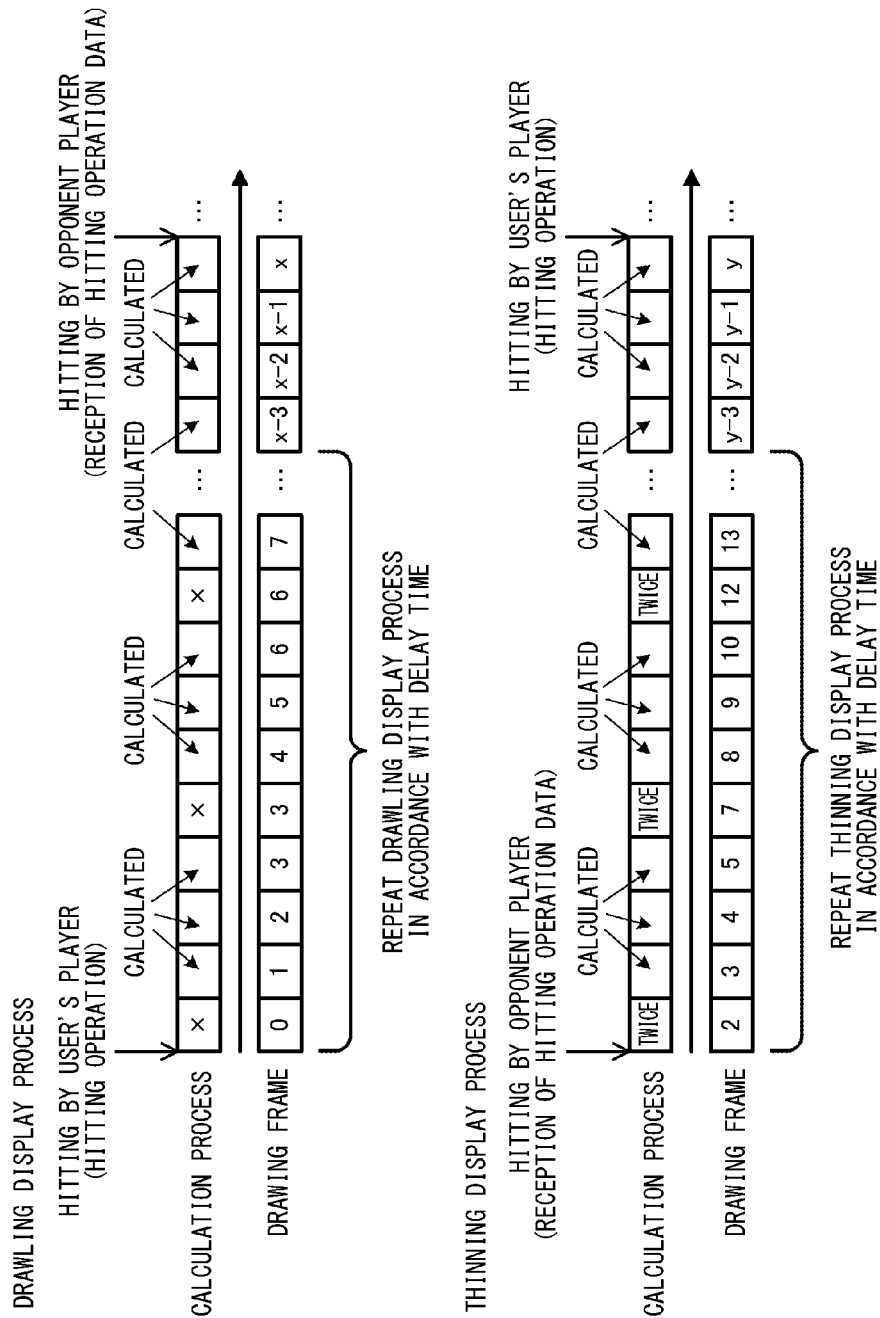
FIG. 5 is a diagram showing non-limiting examples of frames in which the information processing apparatuses 3a and 3b perform drawing.

Next, with reference to FIGS. 3A to 5, a description is given of an overview of the processing performed by the information processing system 1, before the description of specific processing performed by the information processing apparatus 3, It should be noted that FIGS. 3A and B are diagrams showing examples of screens displayed in the information processing apparatuses 3a and 3b included in the information processing system 1. FIG. 4 is a diagram showing examples of the processing operations of the information processing apparatuses 3a and 3b. FIG. 5 is a diagram showing examples of frames in which the information processing apparatuses 3a and 3b perform drawing.

In FIGS. 3A and 3B, the information processing apparatuses 3a and 3b included in the information processing system 1 transmit and receive communication data (operation data) to and from each other, thereby executing the same game program to advance a game. As an example, in an exemplary game in FIGS. 3A and 3B, on a display screen (the monitor 4) of each of the information processing apparatuses 3a and 3b, a tennis game is displayed where a player Pa operated by the user of the information processing apparatus 3a competes against a player Pb operated by the user of the information processing apparatus 3b.

On the screen displayed in the information processing apparatus 3a and shown in FIG. 3A, the tennis game is displayed where the user's player Pa operated by the user of the information processing apparatus 3a competes against the opponent player Pb. Specifically, on the screen displayed in the information processing apparatus 3a, a game image is displayed such that the user's player Pa operated by the user of the information processing apparatus 3a is displayed on the near side of a court, and the opponent player Pb is displayed on the far side of the court. On the other hand, on the screen displayed in the information processing apparatus 3b and shown in FIG. 3B, the tennis game is displayed where the user's player Pb operated by the user of the information processing apparatus 3b competes against the opponent player Pa. Specifically, on the screen displayed in the information processing apparatus 3b, a game image is displayed such that the user's player Pb operated by the user of the information processing apparatus 3b is displayed on the near side of the court, and the opponent player Pa is displayed on the far side of the court.

In the exemplary embodiment, the players Pa and Pb take action in accordance with the operations of the respective users. For example, the user's player Pa on the screen displayed in the information processing apparatus 3a takes action in accordance with the fact that the user of the information processing apparatus 3a has operated the operation section 21 of the information processing apparatus 3a. Then, the information processing apparatus 3a receives, from the information processing apparatus 3b, operation information representing an operation on the operation section 21 of the information processing apparatus 3b, and the opponent player Pb on the screen displayed in the information processing apparatus 3a takes action in accordance with the operation information. On the other hand, the user's player Pb on the screen displayed in the information processing apparatus 3b takes action in accordance with the fact that the user of the information processing apparatus 3b has operated the operation section 21 of the information processing apparatus 3b. Then, the information processing apparatus 3b receives, from the information processing apparatus 3a, operation information representing an operation on the operation section 21 of the information processing apparatus 3a, and the opponent player Pa on the screen displayed in the information processing apparatus 3b takes action in accordance with the operation information. That is, the action of each opponent player is controlled by receiving operation information of the user who is operating the opponent player. Thus, the action of the opponent player represented by each of the information processing apparatuses 3a and 3b is delayed at least by a time for transmitting and receiving the operation information.

In the exemplary embodiment, to synchronize the progression of the game between the information processing apparatuses 3a and 3b by absorbing such a delay time, drawing frames of game images to be displayed are subjected to drawling display and/or thinning display. For example, as shown in FIG. 3A, during the period from when the opponent player (the player Pb in the example of FIG. 3A) hits a ball to when the user's player (the player Pa in the example of FIG. 3A) hits the ball, the game images are displayed by dropping some of the drawing frames for display (thinning display). Thus, the period from when the opponent player hits the ball to when the user's player hits the ball is shortened in accordance with the number of the dropped drawing frames (for example, shorted by a delay time to be caused until operation information of the opponent is received). This makes it possible to absorb the delay time. Further, as shown in FIG. 3B, during the period from when the user's player (the player Pb in the example of FIG. 3B) hits the ball to when the opponent player (the player Pa in the example of FIG. 3B) hits the ball, the game images are displayed by duplicating some of the drawing frames for display (drawling display). Thus, the period from when the user's player hits the ball to when the opponent player hits the ball is lengthened in accordance with the number of the drawing frames displayed in a duplicated manner (for example, lengthened by a delay time to be caused until operation information of the user is received by the opponent's apparatus). This makes it possible to absorb the delay time.

As shown in FIG. 4, the number of drawing frames to be subjected to drawling display and/or thinning display is set in accordance with the delay time. This makes it possible to synchronize the progression of the game between the information processing apparatuses 3a and 3b. For example, it is assumed that in accordance with the pressing of a predetermined operation button included in the operation section 21, the user's player takes the action of hitting the ball. In this case, in accordance with the fact that the user of the information processing apparatus 3a has performed the operation of pressing the operation button included in the information processing apparatus 3a, the scene where the user's player Pa hits the ball is displayed on the monitor 4 of the information processing apparatus 3a, and hitting operation data indicating that the pressing operation has been performed is transmitted from the information processing apparatus 3a to the information processing apparatus 3b.

The hitting operation data transmitted from the information processing apparatus 3a is received by the information processing apparatus 3b via the network 100, and a delay time is caused by the transmission of the hitting operation data from the information processing apparatus 3a and the reception of the hitting operation data by the information processing apparatus 3b. Thus, the scene where the opponent player Pa displayed on the monitor 4 of the information processing apparatus 3b hits the ball is displayed later by the delay time than the time when the same scene is displayed in the information processing apparatus 3a. Thus, to absorb the delay time to be caused by the transmission of the hitting operation data from the information processing apparatus 3a to the information processing apparatus 3b, the information processing apparatus 3b starts the process of performing thinning display by shortening the display of the game images by the delay time. Specifically, after having received the hitting operation data from the information processing apparatus 3a, the information processing apparatus 3b starts a thinning display process for dropping drawing frames in accordance with the delay time to absorb the delay time, and waits for the user of the information processing apparatus 3b to perform a hitting operation (the operation of pressing the operation button included in the information processing apparatus 3b) (a thinning display period for the information processing apparatus 3b shown in FIG. 4).

Next, in accordance with the fact that the user of the information processing apparatus 3b has pressed the operation button, the user's player Pb takes the action of hitting the ball. In this case, the scene where the user's player Pb hits the ball is displayed on the monitor 4 of the information processing apparatus 3b, and hitting operation data indicating that the pressing operation has been performed is transmitted from the information processing apparatus 3b to the information processing apparatus 3a.

The hitting operation data transmitted from the information processing apparatus 3b is received by the information processing apparatus 3a via the network 100, and a delay time is caused by the transmission of the hitting operation data from the information processing apparatus 3b and the reception of the hitting operation data by the information processing apparatus 3a. Thus, the scene where the opponent player Pb displayed on the monitor 4 of the information processing apparatus 3a hits the ball is also displayed later by the delay time than the time when the same scene is displayed in the information processing apparatus 3b. Thus, to absorb the delay time to be caused by the transmission of the hitting operation data from the information processing apparatus 3b to the information processing apparatus 3a, the information processing apparatus 3a performs the following process. After having transmitted the hitting operation data to the information processing apparatus 3b, the information processing apparatus 3a starts the process of performing drawling display by lengthening the display of the game images by the delay time. Specifically, after having transmitted the hitting operation data to the information processing apparatus 3b, the information processing apparatus 3a starts a drawling display process for displaying drawing frames in a duplicated manner in accordance with the delay time to absorb the delay time, and waits for the reception of the hitting operation data from the information processing apparatus 3b (the operation data indicating that the operation of pressing the operation button included in the information processing apparatus 3b has been performed) (a drawling display period for the information processing apparatus 3a shown in FIG. 4).

In addition, similarly to the information processing apparatus 3b as described above, to absorb the delay time to be caused by the transmission of the hitting operation data from the information processing apparatus 3b to the information processing apparatus 3a, the information processing apparatus 3a starts the process of performing thinning display by shortening the display of the game images by the delay time. Specifically, after having received the hitting operation data from the information processing apparatus 3b, the information processing apparatus 3a starts the thinning display process for dropping drawing frames in accordance with the delay time to absorb the delay time, and waits for the user of the information processing apparatus 3a to perform a hitting operation (the operation of pressing the operation button included in the information processing apparatus 3a) (a thinning display period for the information processing apparatus 3a shown in FIG. 4).

Meanwhile, to absorb the delay time to be caused by the next reception of the hitting operation data from the information processing apparatus 3a to the information processing apparatus 3b, also the information processing apparatus 3b performs the following process. After having transmitted the hitting operation data to the information processing apparatus 3a, the information processing apparatus 3b starts the process of performing drawling display by lengthening the display of the game images by the delay time. Specifically, after having transmitted the hitting operation data to the information processing apparatus 3a, the information processing apparatus 3b starts the drawling display process for displaying drawing frames in a duplicated manner in accordance with the delay time to absorb the delay time, and waits for the reception of the hitting operation data from the information processing apparatus 3a (a drawling display period for the information processing apparatus 3b shown in FIG. 4).

As described above, each of the information processing apparatuses 3a and 3b repeats the operation of, after having transmitted hitting operation data, performing the drawling display process and waiting for the reception of hitting operation data from the opponent's apparatus, and the operation of after having received the hitting operation data from the opponent's apparatus, performing the thinning display process and waiting for the user to perform a hitting operation. This makes it possible to absorb the delay time to be caused by the transmission and the reception of the hitting operation data and the like.

For example, the drawling display process and the thinning display process described above are achieved by performing the process of displaying drawing frames in a duplicated manner and the process of dropping drawing frames the numbers of times based on the delay time and at a predetermined processing interval. With reference to FIG. 5, a description is given below of an example where the drawling display process and the thinning display process described above are performed.

As shown in FIG. 5, the drawling display process is started when a hitting operation has been performed on the user's apparatus. Then, the drawling display process is performed by displaying the same drawing frame (the drawing frames indicated by "3" and "6" in FIG. 5) twice every predetermined frames (for example, every four frames). Here, when drawing frames are displayed in a duplicated manner, it is possible to use data of a previously displayed virtual world. Thus, a calculation process for updating the state of the virtual world is skipped (the frames indicated by X-marks in FIG. 5). It should be noted that if the game processing is performed in units of ¹⁄₆₀ seconds, which is generally used, the time for displaying one drawing frame (one frame time) is about 16.7 ms (milliseconds), and therefore, the duplicated display of drawing frames is repeated about every 66.7 ms. Then, after the process of displaying drawing frames in a duplicated manner every predetermined frames has been repeated the number of times based on the delay time (typically, the number of times corresponding to the number obtained by dividing the delay time by one frame time), the drawling display process is ended and returned to a normal display process.

In addition, the thinning display process is started when hitting operation data has been acquired from the opponent's apparatus. Then, the thinning display process is performed by dropping drawing frames (the drawing frames that should be indicated between "5" and "7" and between "10" and "12" in FIG. 5) every predetermined frames (for example, every four frames). Here, when drawing frames are dropped, drawing frames obtained after the calculation process for updating the state of the virtual world is repeated twice are displayed (the frames describing "twice" in FIG. 5). It should be noted that if the game processing is performed in units of ¹⁄₆₀ seconds, which is generally used, the dropping of drawing frames is repeated about every 66.7 ms. Then, after the process of dropping drawing frames every predetermined frames has been repeated the number of times based on the delay time (typically, the number of times corresponding to the number obtained by dividing the delay time by one frame time), the thinning display process is ended and returned to the normal display process.

In the above examples of the drawling display process and the thinning display process, after the process of displaying drawing frames in a duplicated manner or the process of dropping drawing frames has been repeated at a fixed frame interval (for example, every four frames), the process is returned to the normal display process. The drawling display process is thus performed, and thereby can be ended at a time relatively early in the period from when a hitting operation has been performed on the user's apparatus to when hitting operation data is received from the opponent's apparatus. Thus, even if hitting operation data from the opponent's apparatus has been received relatively early, it is possible to certainly absorb the delay time. Further, the thinning display process is thus performed, and thereby can be ended at a time relatively early in the period from when hitting operation data has been received from the opponent's apparatus to when a hitting operation is performed on the user's apparatus. Thus, even if a hitting operation has been performed on the user's apparatus relatively early, it is possible to certainly absorb the delay time. It should be noted that the interval for performing the process of displaying drawing frames in a duplicated manner or the interval for performing the process of dropping drawing frames may be changed in accordance with the delay time. For example, if the delay time is relatively short, the interval for performing the process may be set to be relatively long. If the delay time is relatively long, the interval for performing the process may be set to be relatively short.

In addition, if the above effects are not desired, the process may be performed uniformly during the period from when a hitting operation has been performed on the user's apparatus to when hitting operation data is received from the opponent's apparatus, or the period from when hitting operation data has been received from the opponent's apparatus to when a hitting operation is performed on the user's apparatus (typically, the process may be performed at a frame interval obtained by dividing the number of frames corresponding to the period by the number of times of repetition described above). In this case, the interval for performing the process of displaying drawing frames in a duplicated manner or the interval for performing the process of dropping drawing frames can be set to be relatively long.

In addition, the drawling display process and the thinning display process may be performed when the delay time is equal to or greater than a predetermined time. For example, the drawling display process and the thinning display process may be performed when the delay time is equal to or greater than the time for displaying four drawing frames (four frame times: about 66.7 ms).

In addition, the above description is given using the example where in accordance with the fact that the operation of pressing the operation button has been performed, the user's player takes a hitting action. Alternatively, the game may be one where the user's player takes a hitting action in accordance with another operation. As an example, the game may be one where in accordance with the fact that a predetermined sound has been input, the user's player takes a hitting action. As another example, the drawling display process and the thinning display process can be performed also in the following game. The accelerations generated by swinging the input apparatus 2 are detected by the acceleration sensor 22, or the angular velocities that change by swinging the input apparatus 2 are detected by the gyro sensor 23. Then, the swing motion of the user holding the input apparatus 2 is determined using the detection results, and the user's player takes a hitting action in accordance with the swing motion. In this case, operation data indicating the accelerations or the angular velocities (operation data including the acceleration information and/or the angular velocity information) is transmitted to the opponent's apparatus as needed or always, and also the opponent's apparatus determines the swing motion as described above, thereby controlling the hitting action of the opponent player. Then, the drawling display process is started at the time of hitting by the user's player, and the thinning display process is started at the time of hitting by the opponent player. This makes it possible to similarly achieve the exemplary embodiment. That is, in a game where a player takes a hitting action on the basis of the acceleration information and/or the angular velocity information, the drawling process is started after predetermined operation data (operation data corresponding to the time when the user's player takes a hitting action) in the operation data transmitted and received as needed or always has been transmitted, and the thinning process is started after predetermined operation data (operation data corresponding to the time when the opponent player takes a hitting action) in the operation data transmitted and received as needed or always has been received.

In addition, the drawling display process and the thinning display process are described above using the example where these processes are achieved by performing the process of displaying drawing frames in a duplicated manner and the process of dropping drawing frames the numbers of times based on the delay time. Alternatively, these processes may be performed the numbers of times determined in advance. As an example, the number of times each process is performed is set in advance to a plurality of values (for example, two values), and either value is selected in accordance with the length of the delay time. In this case, it is possible to gradually absorb the delay time described above by performing the drawling display process and/or the thinning display process. As another example, even if the number of times each process is performed is set in advance to one fixed value, it is possible, by performing the drawling display process and/or the thinning display process, to absorb the delay time described above to some extent as compared to the state where these processes are not performed.

In addition, to absorb the delay time, only either one of the drawling display process and the thinning display process may be performed. For example, to absorb the delay time only by the drawling display process, the process of displaying drawing frames in a duplicated manner is repeated the number of times based on a round-trip delay time to be caused by the round trip of operation data during the period from when a hitting operation has been performed on the user's apparatus to when hitting operation data is received from the opponent's apparatus (for example, the time obtained by adding the delay time to be caused by the transmission of hitting operation data from the information processing apparatus 3a to the information processing apparatus 3b to the delay time to be caused by the transmission of hitting operation data from the information processing apparatus 3b to the information processing apparatus 3a). Further, to absorb the delay time only by the thinning display process, the process of dropping drawing frames is repeated the number of times based on a round-trip delay time to be caused by the round trip of operation data during the period from when hitting operation data has been received from the opponent's apparatus to when a hitting operation is performed on the user's apparatus.

In addition, the exemplary game is described above using a game performed using two information processing apparatuses 3. Alternatively, it is possible to absorb the delay time by the drawling display process and/or the thinning display process described above also in a game performed using three or more information processing apparatuses 3. For example, in a game performed using three information processing apparatuses 3a to 3c, if a player operated using the information processing apparatus 3a hits a ball toward a player operated using the information processing apparatus 3b, the drawling display process is performed on the information processing apparatus 3a, the thinning display process is performed on the information processing apparatus 3b, and the normal display process is performed on the information processing apparatus 3c. As described above, the drawling display process and/or the thinning display process described above are performed in accordance with the opponent toward which the ball has been hit, whereby it is possible to similarly absorb the delay time to be caused by the transmission and the reception of communication data also in a game performed using three or more information processing apparatuses 3.

Next, a detailed description is given of the processing performed by each information processing apparatus 3. First, with reference to FIG. 6, main data used in the processing is described. It should be noted that FIG. 6 is a diagram showing examples of main data and programs stored in the memory 33 of the information processing apparatus 3.

Figure 6:
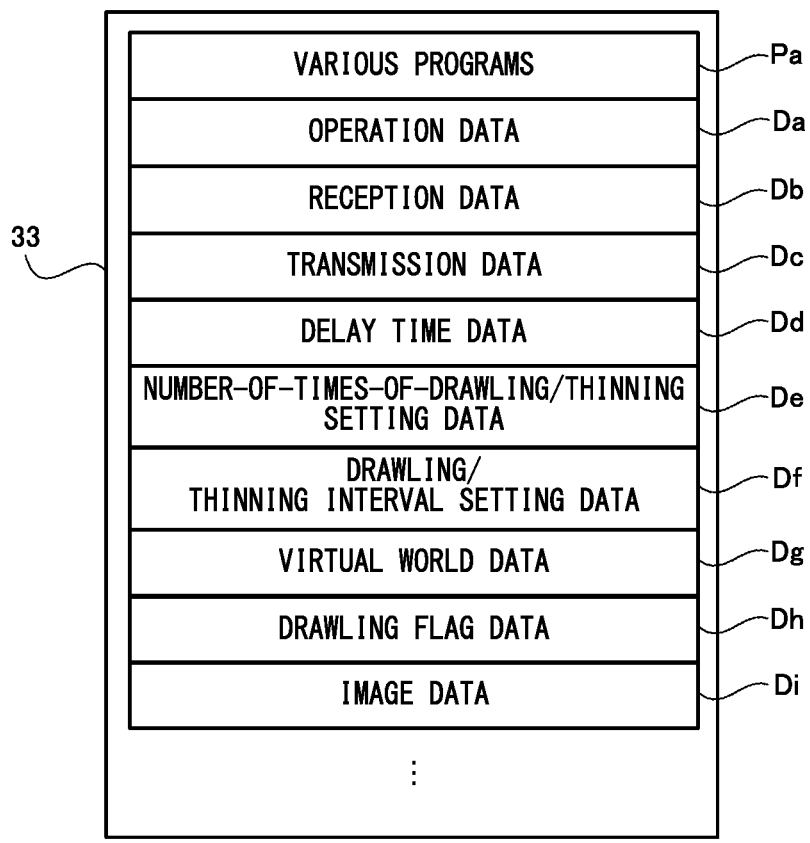
FIG. 6 is a diagram showing non-limiting examples of main data and programs stored in a memory 33 of the information processing apparatus 3.

As shown in FIG. 6, the following are stored in the data storage area of the memory 33: operation data Da; reception data Db; transmission data Dc; delay time data Dd; number-of-times-of-drawling/thinning setting data De; drawling/thinning interval setting data Df; virtual world data Dg; drawling flag data Dh; image data Di; and the like. It should be noted that the memory 33 stores, as well as the data shown in FIG. 6, data necessary for the processing, such as data used in an application to be executed. Further, in the program storage area of the memory 33, various programs Pa included in the information processing program are stored.

The operation data Da is data representing operation information of an operation performed on the operation section 21 by the user. For example, operation data indicating an operation performed on the operation section 21 such as an operation button is acquired per unit of time that the information processing apparatus 3 performs processing (for example, every 1/60 seconds), and the operation data is stored and updated in the operation data Da in accordance with the acquisition.

The reception data Db is data received from another one of the information processing apparatuses 3. The transmission data Dc is data to be transmitted to the other information processing apparatus 3.

The delay time data Dd is data representing the time (a delay time) required for transmitting and receiving communication data to and from an opponent's apparatus with which a versus game is performed using the information processing apparatus 3. The delay time data Dd is measured and stored before the versus game is started. The number-of-times-of-drawling/thinning setting data De is data representing the number of times the drawling display process is performed and the number of times the thinning display process is performed. These numbers of times are set in accordance with the measured delay time. The drawling/thinning interval setting data Df is data representing the interval for performing the drawling display process and the interval for performing the thinning display process.

The virtual world data Dg is data regarding a virtual world in the versus game, the virtual world constructed on the basis of operation data of the user's apparatus and operation data received from the opponent's apparatus. As an example, the virtual world data Dg includes: data regarding the positions, the orientations, the actions, and the like of a user's player and an opponent player that appear in the virtual world; data regarding the position, the moving direction, the moving velocity, and the like of another object (for example, a ball) that appears in the virtual world; data regarding a virtual camera for generating a virtual world image to be displayed on the monitor 4; and the like.

The drawling flag data Dh is data representing a drawling flag, which is set to on when the period is one in which the drawling display process is performed, and is set to off when the period is one in which the thinning display process is performed.

The image data Di is data in use for generating a virtual world image, and is data representing images of the user's player, the opponent player, and another object that appear in the virtual world, a background image, and the like.

Figure 7:
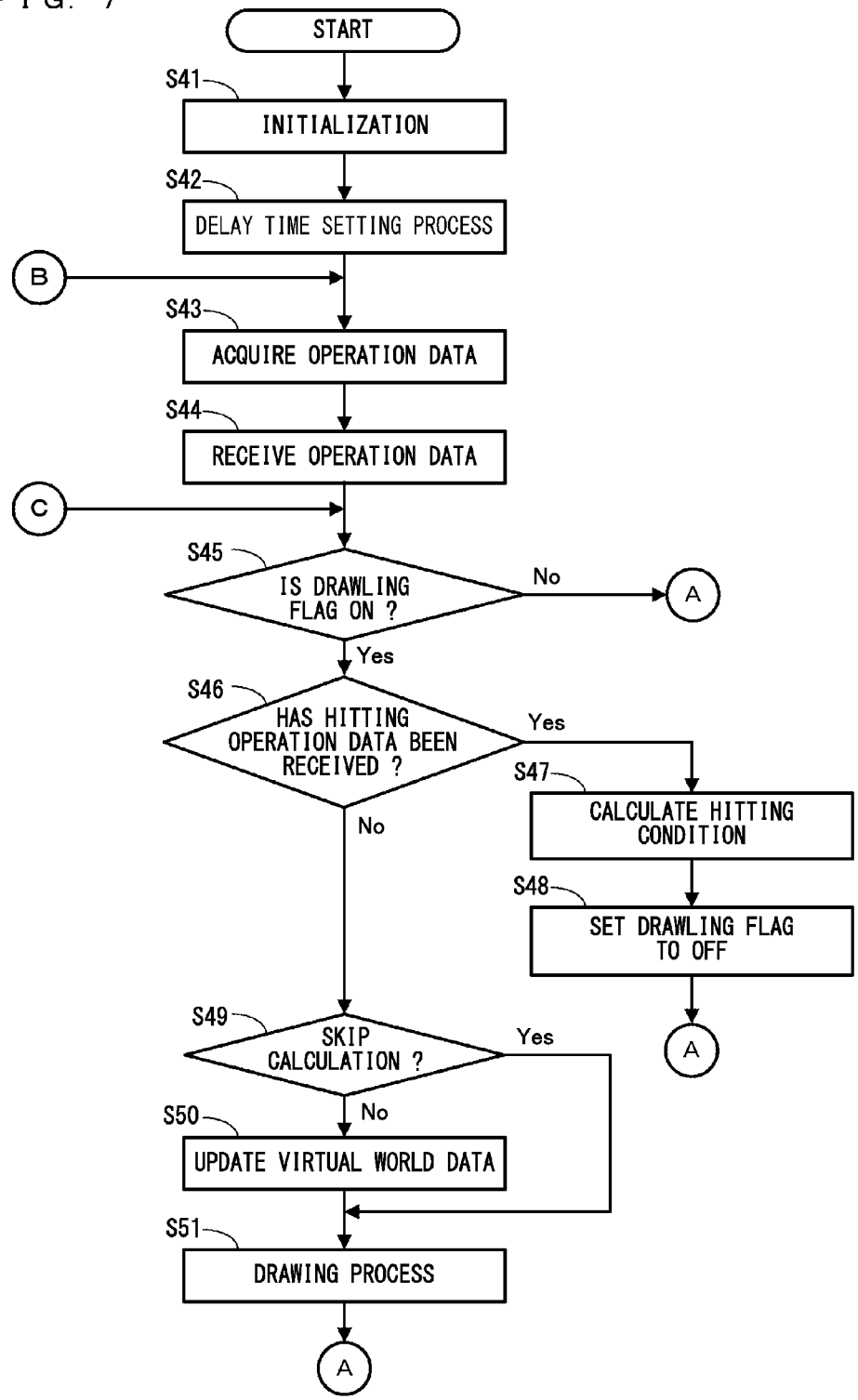
FIG. 7 is a flow chart showing a non-limiting example of the first half of the processing executed by the information processing apparatus 3.
Figure 8:
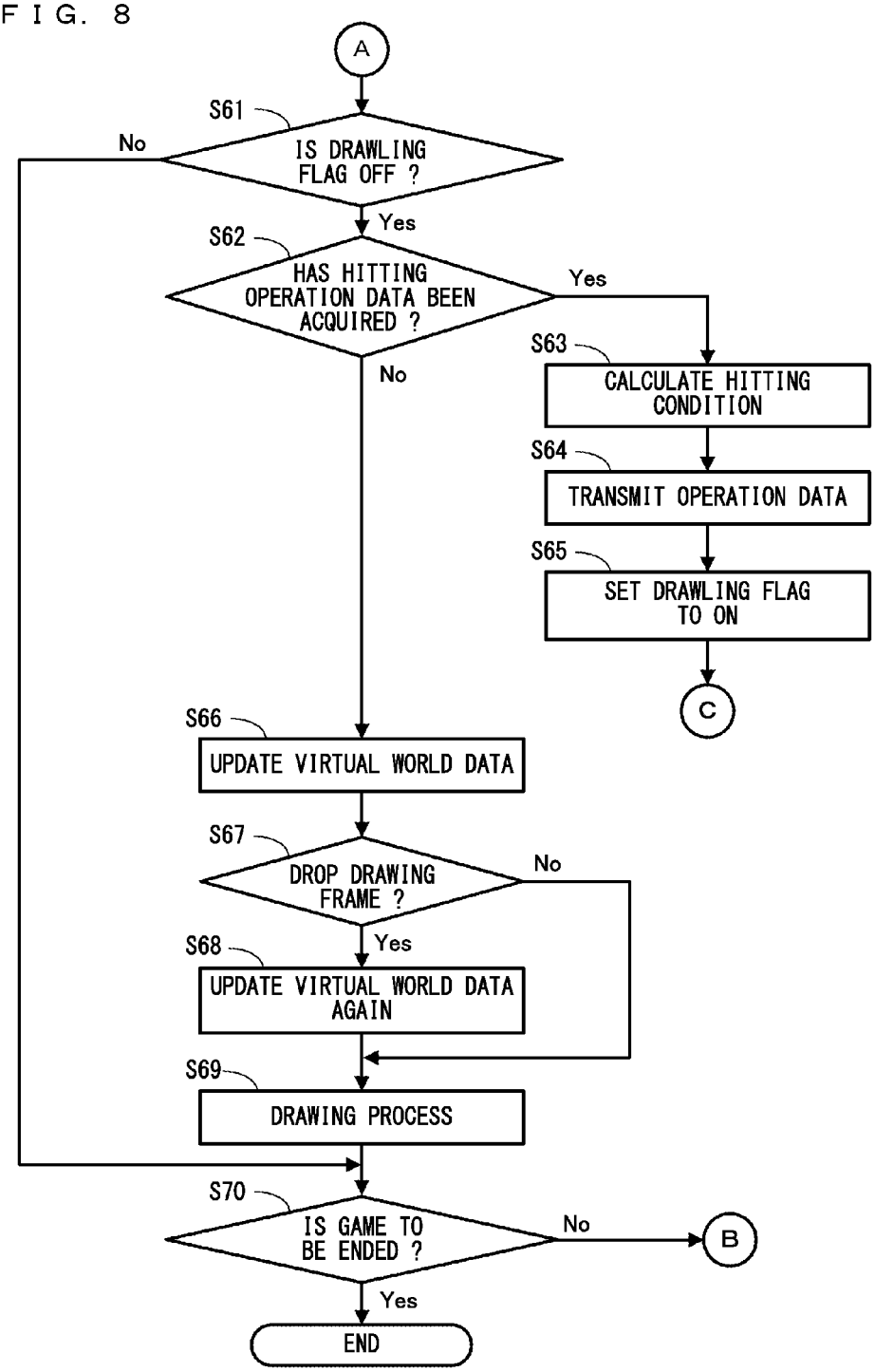
FIG. 8 is a flow chart showing a non-limiting example of the second half of the processing executed by the information processing apparatus 3.

Next, with reference to FIGS. 7 and 8, a detailed description is given of the processing performed by the information processing apparatus 3. It should be noted that FIG. 7 is a flow chart showing an example of the first half of the processing performed by the information processing apparatus 3. FIG. 8 is a flow chart showing an example of the second half of the processing performed by the information processing apparatus 3. Here, in the flow charts shown in FIGS. 7 and 8, descriptions are given mainly of processes regarding the versus game performed using the information processing apparatus 3 and another one of the information processing apparatuses 3. The detailed descriptions of other processes not directly related to these processes are omitted. Further, in FIGS. 7 and 8, all the steps performed by the CPU 32 are abbreviated as "S".

In the exemplary embodiment, the series of processes shown in FIGS. 7 and 8 are performed by the CPU 32 executing the information processing program stored in the program storage section 34. It should be noted that the processing shown in FIGS. 7 and 8 is started at any timing. A part or all of the information processing program is loaded into the memory 33 at appropriately timing and executed by the CPU 32. Thus, the series of processes shown in FIGS. 7 and 8 are started. It should be noted that the information processing program is stored in advance in the program storage section 34. In another exemplary embodiment, the information processing program may be acquired from a storage medium attachable to and detachable from the information processing apparatus 3 and stored in the memory 33, or may be acquired from another apparatus via a network such as the Internet and stored in the memory 33.

It should be noted that the processes of all the steps in the flow charts shown in FIGS. 7 and 8 are merely illustrative. Thus, the processing order of the steps may be changed, or another process may be performed in addition to and/or instead of the processes of all the steps, so long as similar results are obtained. Further, in the exemplary embodiment, descriptions are given on the assumption that the CPU 32 performs the processes of all the steps in the flow charts. Alternatively, a processor or a dedicated circuit other than the CPU may perform the processes of some or all of the steps in the flow charts.

In FIG. 7, the CPU 32 performs initialization (step 41), and the processing proceeds to the next step. For example, on the basis of a predetermined matching process, the CPU 32 sets another one of the information processing apparatuses 3 to serve as a communication partner apparatus when the versus game is performed. Further, the CPU 32 arranges various objects, such as a user's player object and an opponent player object, and a background in a virtual world to construct a virtual world to be displayed on the monitor 4, thereby updating the virtual world data Dg. Further, the CPU 32 initializes parameters in use for the game processing (for example, initializes the drawling flag to off if the user's player hits a ball first (for example, the user's player serves the ball), or initializes the drawling flag to on if the opponent player hits the ball first (for example, the user's player receives the ball), thereby updating the drawling flag data Dh.

Next, the CPU 32 performs the process of setting a delay time to be caused between the information processing apparatus 3 and the communication partner apparatus (step 42), and the processing proceeds to the next step. For example, the CPU 32 transmits, via the communication section 31, predetermined data for measuring a delay time to the communication partner apparatus (that is, the information processing apparatus 3 of the opponent with which the versus game is performed using the information processing apparatus 3), and measures the time from the transmission of the predetermined data to the reception of data returned in response to the predetermined data. Then, the CPU 32 updates the delay time data Dd using data indicating the measured time.

In addition, in the above step 42, in accordance with the time (the delay time) represented by the delay time data Dd, the CPU 32 sets the interval for performing the drawling display process, the number of times the drawling display process is performed, the interval for performing the thinning display process, and the number of times the thinning display process is performed when the versus game is performed, thereby updating the number-of-times-of-drawling/thinning setting data De and the drawling/thinning interval setting data Df. As an example, if the time represented by the delay time data Dd indicates a delay time to be caused by the round trip of data between the user's apparatus and the communication partner apparatus, the CPU 32 sorts the number of times corresponding to the number obtained by dividing the delay time by one frame time, into the number of times the drawling display process is performed and the number of times the thinning display process is performed (for example, into the same numbers), thereby setting the numbers of times. As another example, if the time represented by the delay time data Dd indicates a delay time to be caused by the round trip of data between the users apparatus and the communication partner apparatus, the CPU 32 sets the number of times corresponding to the number obtained by dividing half the delay time by one frame time, as each of the number of times the drawling display process is performed and the number of times the thinning display process is performed. Then, the CPU 32 sets each of the interval for performing the drawling display process and the interval for performing the thinning display process, to a fixed value (for example, every four frames), and sets the time to perform the drawling display process and the time to perform the thinning display process. It should be noted that if the time represented by the delay time data Dd is less than a predetermined time (for example, a delay time to be caused by the round trip of data between the user's apparatus and the communication partner apparatus or a delay time to be caused by a one-way trip is less than four frame times (about 66.7 ms)), the CPU 32 sets each of the number of times the drawling display process is performed and the number of times the thinning display process is performed, to 0.

Next, the CPU 32 acquires operation data from the input apparatus 2, thereby updating the operation data Da (step 43), and the processing proceeds to the next step. For example, the CPU 32 updates the operation data Da using data representing the content of an operation on the operation section 21.

Next, the CPU 32 receives operation data from the other information processing apparatus 3, which is the communication partner apparatus (step 44), and the processing proceeds to the next step. For example, if having received operation data from the other information processing apparatus 3, the CPU 32 updates the reception data Db using the operation data.

Next, with reference to the drawling flag data Dh, the CPU 32 determines whether or not the drawling flag is set to on (step 45). Then, if the CPU 32 has determined that the drawling flag is set to on, the processing proceeds to step 46. If, on the other hand, the CPU 32 has determined that the drawling flag is set to off, the processing proceeds to step 61 (see FIG. 8).

In step 46, with reference to the reception data Db, the CPU 32 determines whether or not hitting operation data has been received from the communication partner apparatus in the above step 44. Then, if the CPU 32 has determined that hitting operation data has been received from the communication partner apparatus, the processing proceeds to step 47. If, on the other hand, the CPU 32 has determined that hitting operation data has not been received from the communication partner apparatus, the processing proceeds to step 49. Here, the hitting operation data is data indicating that a user operation has been performed to cause the player to take the action of hitting the ball. The hitting operation data is, for example, operation data indicating that a predetermined operation button has been pressed. It should be noted that to accurately convey the time at which the hitting operation has been performed, the frame number of the frame in which the hitting operation has been performed may be transmitted and received together with the hitting operation data. In the above step 46, it is determined whether or not such hitting operation data has been received from the communication partner apparatus operated by the opponent in the versus game.

In step 47, the CPU 32 calculates a hitting condition, and the processing proceeds to the next step. For example, in accordance with the state of the virtual world (for example, the position, the orientation, and the state of the action of the opponent player, the position of the ball to be hit, and the like), the state of the hitting operation (for example, the time (the frame number) at which the hitting operation has been performed, the strength and the speed of the hitting operation, and the like), and the like, the CPU 32 calculates the initial trajectory of the hit ball (for example, the moving direction and the moving speed of the ball immediately after the hitting).

Next, the CPU 32 sets the drawling flag to off, thereby updating the drawling flag data Dh (step 48), and the processing proceeds to step 61 (see FIG. 8).

In step 49, the CPU 32 determines whether or not the current time is the time to skip the calculation for updating the virtual world and display a drawing frame in a duplicated manner (the drawling display process). Then, if the CPU 32 has determined that the current time is not the time to skip the calculation, the processing proceeds to step 50. If, on the other hand, the CPU 32 has determined that the current time is the time to skip the calculation, the processing proceeds to step 51. For example, the time to skip the calculation for updating the virtual world and display a drawing frame in a duplicated manner has been set in the process of step 42, and the result of the setting is stored in the number-of-times-of-drawling/thinning setting data De and the drawling/thinning interval setting data Df Thus, with reference to the number-of-times-of-drawling/thinning setting data De and the drawling/thinning interval setting data Df, the CPU 32 determines whether or not the current time is the time to perform the drawling display process.

In step 50, the CPU 32 performs the process of updating the virtual world data, and the processing proceeds to step 51. For example, the CPU 32 changes the positions, the orientations, the actions, and the like of the virtual objects (including the user's player and the opponent player) and the like in the virtual world set in the virtual world data Dg and the position, the orientation, and the like of the virtual camera set in the virtual world data Dg, on the basis of the operation data represented by the operation data Da and the reception data Db, the law of nature set in the virtual world, the action rules set for the objects and the virtual camera, and the like, thereby updating the virtual world data Dg.

In step 51, the CPU 32 performs a drawing process, and the processing proceeds to step 61 (see FIG. 8). For example, on the basis of the virtual world data Dg, the CPU 32 constructs a virtual world in which the objects are arranged, and generates a virtual world image obtained by viewing the virtual world from the virtual camera. Then, the CPU 32 outputs the generated virtual world image to the monitor 4, thereby displaying the virtual world image on the monitor 4.

It should be noted that if the determination has been affirmative in the above step 49, the drawing process in the above step 51 is performed without updating the virtual world data in the above step 50. That is, if the determination has been affirmative in the above step 49, the drawing process is performed using the same data as the virtual world data used in the previous drawing process, and the same drawing frame is displayed on the monitor 4 twice. The virtual world data update process in the above step 50 is thus skipped, thereby performing the drawling display process for displaying a drawing frame in a duplicated manner.

Referring next to FIG. 8, in step 61, with reference to the drawling flag data Dh, the CPU 32 determines whether or not the drawling flag is set to off. Then, if the CPU 32 has determined that the drawling flag is set to off, the processing proceeds to step 62. If, on the other hand, the CPU 32 has determined that the drawling flag is set to on, the processing proceeds to step 70.

In step 62, with reference to the operation data Da, the CPU 32 determines whether or not the operation data acquired in the above step 43 is data representing a hitting operation using the operation section 21 (that is, hitting operation data). Then, if the CPU 32 has determined that a hitting operation has been performed using the operation section 21, the processing proceeds to step 63. If, on the other hand, the CPU 32 has determined that a hitting operation using the operation section 21 has not been performed, the processing proceeds to step 66.

In step 63, the CPU 32 calculates a hitting condition, and the processing proceeds to the next step. For example, in accordance with the state of the virtual world (for example, the position, the orientation, and the state of the action of the user's player, the position of the ball to be hit, and the like), the state of the hitting operation (for example, the time at which the hitting operation has been performed, the strength and the speed of the hitting operation, and the like), and the like, the CPU 32 calculates the initial trajectory of the hit ball (for example, the moving direction and the moving speed of the ball immediately after the hitting).

Next, the CPU 32 transmits the operation data to the communication partner apparatus (step 64), and the processing proceeds to the next step. For example, the CPU 32 stores in the transmission data Dc the operation data acquired in the above step 43 (that is, the hitting operation data) together with the current frame number. Then, the CPU 32 transmits the operation data and the data indicating the frame number that have been stored in the transmission data Dc to the communication partner apparatus via the communication section 31.

Next, the CPU 32 sets the drawling flag to on, thereby updating the drawling flag data Dh (step 65), and the processing proceeds to the above step 45 (see FIG. 7).

In step 66, the CPU 32 performs the process of updating the virtual world data, and the processing proceeds to the next step. It should be noted that the process of updating the virtual world data is similar to the above step 50, and therefore is not described in detail here.

Next, the CPU 32 determines whether or not the current time is the time to drop a drawing frame (the thinning display process) (step 67). Then, if the CPU 32 has determined that the current time is the time to drop a drawing frame, the processing proceeds to step 68. If, on the other hand, the CPU 32 has determined that the current time is not the time to drop a drawing frame, the processing proceeds to step 69. For example, the time to drop a drawing frame has been set in the process of step 42, and the result of the setting is stored in the number-of-times-of-drawling/thinning setting data De and the drawling/thinning interval setting data Df. Thus, with reference to the number-of-times-of-drawling/thinning setting data De and the drawling/thinning interval setting data Df, the CPU 32 determines whether or not the current time is the time to perform the thinning display process.

In step 68, the CPU 32 performs the process of updating the virtual world data again, and the processing proceeds to step 69. For example, the CPU 32 changes the positions, the orientations, the actions, and the like of the virtual objects and the like in the virtual world set in the virtual world data Dg updated in the above step 66 and the position, the orientation, and the like of the virtual camera set in the virtual world data Dg updated in the above step 66, on the basis of the law of nature set in the virtual world, the action rules set for the objects and the virtual camera, and the like, thereby updating the virtual world data Dg again. It should be noted that in the process of updating the virtual world data again in the above step 68, to prevent the update based on the operation data represented by the operation data Da and the reception data Db from being performed again, the update based on the operation data is not performed.

In step 69, the CPU 32 performs a drawing process, and the processing proceeds to step 70. It should be noted that the drawing process is similar to that in the above step 51, and therefore is not described in detail here.

It should be noted that if the determination has been affirmative in the above step 67, the drawing process in the above step 69 is performed after the virtual world data has been updated twice. That is, if the determination has been affirmative in the above step 67, the drawing process is performed by dropping a drawing frame to be displayed. As described above, the process of updating the virtual world data is performed twice, thereby performing the thinning display process for dropping a drawing frame.

In step 70, the CPU 32 determines whether or not the game is to be ended. Examples of conditions for ending the game include: the fact that victory or defeat in the versus game has been decided; the satisfaction of the conditions under which the game is over or the game is completed; and the fact that the user has performed the operation of ending the game. If the game is not to be ended, the CPU 32 returns to the above step 43, and repeats the process thereof. If the game is to be ended, the CPU 5 ends the processing indicated in the flow charts. Thereafter, the CPU 32 repeatedly performs a series of processes of steps 43 to 69 until it is determined in step 70 that the game is to be ended.

It should be noted that in the above description, to accurately convey the time at which a hitting operation has been performed, the frame number of the frame in which the hitting operation has been performed is transmitted and received together with hitting operation data. Thus, even if the frame number of a transmission source apparatus indicating the frame in which a hitting operation has been performed in the transmission source apparatus differs from the frame number of a reception destination apparatus indicating the frame in which hitting operation data has been received from the transmission source apparatus, it is possible to match the times of the hitting in both apparatuses based on the frame numbers. If, however, a delay time and the number of frames for absorbing/consuming the delay time are matched with each other by the drawling display process and/or the thinning display process described above, the frame numbers do not differ from each other as described above. Thus, if it is expected that the frame numbers do not differ from each other as described above, it is not necessary to transmit and receive the frame numbers. Thus, data to be transmitted and received to and from the apparatuses may be only operation data representing the contents of operations performed using the respective apparatuses.

In addition, if it is not possible to absorb the delay time only by the drawling display process and/or the thinning display process described above, the delay time may be dealt with by another method. For example, if the reception of hitting operation data is later than the expected time of hitting, an image may be displayed such that the action of the opponent player is temporarily stopped for the delay time. Further, if a plurality of information processing apparatuses 3 are going out of synchronization, the synchronization may be reset by performing control so that if one of the users has performed a hitting operation, the player operated by the user is forced to swing and miss.

In addition, in the above description, drawling display is performed by duplicating some of drawing frames at different times, whereby the drawing frames to be displayed during the period from when an operation (for example, a hitting operation) has been performed on the user's apparatus to when operation data (for example, operation data representing a hitting operation) is received from the opponent's apparatus are displayed for a time longer than normal. Alternatively, the display speed may be adjusted by another method. Further, in the above description, thinning display is performed by dropping some of drawing frames, whereby the drawing frames to be displayed during the period from when operation data (for example, operation data representing a hitting operation) has been received from the opponent's apparatus to when an operation (for example, a hitting operation) is performed on the user's apparatus are displayed for a time shorter than normal. Alternatively, the display speed may be adjusted by another method. As a first example, the cycle of displaying drawing frames (that is, a processing cycle) may be changed, thereby adjusting the display speed. Specifically, the cycle of displaying drawing frames may be changed to be longer than a reference value, thereby performing the process of displaying drawing frames for a time longer than normal, and the cycle of displaying drawing frames may be changed to be shorter than a reference value, thereby performing the process of displaying drawing frames for a time shorter than normal. As a second example, an elapsed time in the virtual world to be assumed when the virtual world is updated may be changed, thereby adjusting the display speed. Specifically, an elapsed time in the virtual world for each update is assumed to be shorter than the cycle of the process of performing the update, thereby performing the process of displaying drawing frames for a time longer than normal, and an elapsed time in the virtual world for each update is assumed to be longer than the cycle of the process of performing the update, thereby performing the process of displaying drawing frames for a time shorter than normal.

In addition, in the processing procedure described above, a delay time is measured before the versus game is performed. Then, the number of times the drawling display process is performed and/or the number of times the thinning display process is performed are set using the measured delay time, and the numbers of times are always fixed during the versus game. Even during the versus game, however, a delay time may be periodically measured. In this case, the number of times the drawling display process is performed and/or the number of times the thinning display process is performed can be reset every time a delay time is measured. This makes is possible to absorb a delay time with higher accuracy.

In addition, the above description is given using the example where two information processing apparatuses 3 alternately exchange operation data. Alternatively, the exemplary embodiment can be applied to another form. For example, when operation data is transmitted from a first information processing apparatus to a second information processing apparatus, the first information processing apparatus starts the drawling display process after having transmitted the operation data, and the second information processing apparatus starts the thinning display process after having received the operation data. As described above, even in the case of the transmission of operation data only from one apparatus to the other apparatus, the one apparatus may perform the drawling display process, and the other apparatus may perform the thinning display process. This makes it possible to absorb a delay time to be caused when the operation data is transmitted and received. In this case, the transmission and the reception of the operation data may be performed only once or multiple times. Further, also when in the exchange of operation data between a plurality of information processing apparatuses, the operation data is not exchanged alternately but is exchanged in random order, one of the information processing apparatuses that transmits the operation data starts the drawling display process after having transmitted the operation data, and another one of the information processing apparatuses that receives the operation data starts the thinning display process after having received the operation data. This makes it possible to similarly absorb the delay time.

In addition, the above description is given using the example of dealing with a delay time to be caused when a plurality of apparatuses perform data communication via a network. It goes without saying, however, that the exemplary embodiment can deal with a delay time to be caused by data communication performed by various methods. For example, even when data communication is performed via a network, the information processing apparatuses 3 and the network 100 may be connected to each other using wired communication, or the information processing apparatuses 3 and the network 100 may be connected wirelessly to each other using a wireless LAN, 3G, or the like. Further, a communication method may be such that communication data transmitted from one of the information processing apparatuses 3 is relayed by another apparatus (for example, a server) provided on the network 100, and is received by another one of the information processing apparatuses 3. Further, the plurality of information processing apparatuses 3 may be directly connected to each other using wireless communication based on near field communication or the like, or using wired communication.

The above description is given using the example of absorbing a communication delay time to be caused when a versus game is performed using apparatuses. Alternatively, the exemplary embodiment can also be applied to the case where other types of information processing are performed using apparatuses. For example, the exemplary embodiment can also be applied to processing in which a plurality of apparatuses exchange information, an image, a remark, and the like using data communication, and display the information, the image, the remark, and the like on display screens of the respective apparatuses, and the like.

It should be noted that the above descriptions are given using the example where the information processing apparatus 3 performs the information processing. Alternatively, another apparatus may perform at least some of the processing steps in the information processing. For example, if the information processing apparatus 3 is further configured to communicate with another apparatus (for example, another server, another game apparatus, another mobile terminal, or another information processing apparatus), the other apparatus may cooperate to perform the processing steps in the information processing. Another apparatus may thus perform at least some of the processing steps in the information processing, which enables information processing similar to that described above. Further, the information processing described above can be performed by a processor or the cooperation of a plurality of processors, the processor and the plurality of processors contained in an information processing system including at least one information processing apparatus. Further, in the exemplary embodiment, the processing indicated in the flow charts described above is performed by the CPU 32 of the information processing apparatus 3 executing a predetermined game program. Alternatively, a part or all of the game processing indicated in the flow charts may be performed by a dedicated circuit included in the information processing apparatus 3.

Here, the above variations make it possible to achieve the exemplary embodiment also by a system form such as cloud computing, or a system form such as a distributed wide area network or a local area network. For example, in a system form such as a distributed local area network, it is possible to execute the above processing between a stationary information processing apparatus (a stationary game apparatus) and a handheld information processing apparatus (a handheld game apparatus) by the cooperation of the apparatuses. It should be noted that, in these system forms, there is no particular limitation on which apparatus performs the process of each step of the above processing. Thus, it goes without saying that it is possible to achieve the exemplary embodiment by sharing the processing in any manner.

In addition, the processing orders, the setting values, the conditions used in the determinations, and the like that are used in the information processing described above are merely illustrative. Thus, it goes without saying that the exemplary embodiment can be achieved also with other orders, other values, and other conditions.

In addition, the program may be supplied to the information processing apparatus 3 not only through an external storage medium such as the external memory, but also through a wired or wireless communication link. Further, the program may be stored in advance in a non-volatile storage device included in the information processing apparatus 3. It should be noted that examples of an information storage medium having stored therein the program may include CD-ROMs, DVDs, optical disk storage media similar to these, flexible disks, hard disks, magneto-optical disks, and magnetic tapes, as well as non-volatile memories. Alternatively, an information storage medium having stored therein the program may be a volatile memory for storing the program. It can be said that such a storage medium is a storage medium readable by a computer or the like. For example, it is possible to provide the various functions described above by causing a computer or the like to load a program from the storage medium and execute it.

The systems, devices and apparatuses described herein may include one or more processors, which may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and which communicates remotely (e.g., wirelessly) with the movable display; or a processor that is part of or is a separate component co-located with the movable display and communicates remotely (e.g., wirelessly) with the stationary display or associated equipment; or a distributed processing arrangement some of which is contained within the movable display housing and some of which is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-designed ASICs (application specific integrated circuits) and/or logic circuitry. In the case of a distributed processor architecture or arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses can be improved and modified in various manners without departing the spirit and scope of the appended claims. It is understood that the scope of the systems, the methods, the devices, and the apparatuses should be interpreted only by the scope of the appended claims. Further, it is understood that the specific descriptions of the exemplary embodiment enable a person skilled in the art to carry out an equivalent scope on the basis of the descriptions of the exemplary embodiment and general technical knowledge. It should be understood that, when used in the specification, the components and the like described in the singular with the word "a" or "an" preceding them do not exclude the plurals of the components. Furthermore, it should be understood that, unless otherwise stated, the terms used in the specification are used in their common meanings in the field. Thus, unless otherwise defined, all the jargons and the technical terms used in the specification have the same meanings as those generally understood by a person skilled in the art in the field of the exemplary embodiment. If there is a conflict, the specification (including definitions) takes precedence.

As described above, the exemplary embodiment is useful as, for example, an information processing system, an information processing apparatus, an information processing program, an information processing method, and the like in order, for example, to deal with a delay to be caused when apparatuses transmit and receive data to and from each other.

What is claimed is:

1. An information processing system including at least a first information processing apparatus and a second information processing apparatus capable of communicating with the first information processing apparatus,
   the first information processing apparatus comprising a first processor and being configured to at least perform:
      a first input acquisition to acquire a user input provided to the first information processing apparatus;
      a first image display control to display on a first display screen an image based on the user input; and
      a first input data transmission to transmit, to the second information processing apparatus, input data representing the user input,
   the second information processing apparatus comprising a second processor and being configured to at least perform:
      a second input data reception to receive the input data transmitted from the first information processing apparatus; and
      a second image display control to display on a second display screen an image based on the input data received by the second input data reception,
   wherein the first image display control includes a low-speed display control to display, for a time longer than normal, a plurality of drawing frames forming images that are to be displayed after transmission of predetermined input data and are based on the user input.

2. The information processing system according to claim 1, wherein the second image display control includes a high-speed display control to display, for a time shorter than normal, a plurality of drawing frames forming images that are to be displayed after reception of the predetermined input data and are based on the input data.

3. The information processing system according to claim 2, wherein
the second information processing apparatus is further configured to at least perform:
a second input acquisition to, after the reception of the predetermined input data, receive and acquire a user input provided to the second information processing apparatus; and
a second input data transmission to transmit, to the first information processing apparatus, input data representing the user input provided to the second information processing apparatus,
the second image display control displays on the second display screen an image based on the user input provided to the second information processing apparatus,
the first information processing apparatus is further configured to at least perform a first input data reception to receive the input data transmitted from the second information processing apparatus,
the first image display control displays on the first display screen an image based on the input data received by the first input data reception,
the low-speed display control displays a plurality of drawing frames on the first display screen for a time longer than normal during a period from transmission of predetermined input data of the first information processing apparatus to reception of predetermined input data of the second information processing apparatus, and
the high-speed display control displays a plurality of drawing frames on the second display screen for a time shorter than normal during a period from reception of the predetermined input data of the first information processing apparatus to transmission of the predetermined input data of the second information processing apparatus.

4. The information processing system according to claim 3, wherein
the low-speed display control displays the plurality of drawing frames on the first display screen during the period from the transmission of the predetermined input data of the first information processing apparatus to the reception of the predetermined input data of the second information processing apparatus, for a time longer than normal by performing drawling display of the plurality of drawing frames at regular intervals during the period, and
the high-speed display control displays the plurality of drawing frames on the second display screen during the period from the reception of the predetermined input data of the first information processing apparatus to the transmission of the predetermined input data of the second information processing apparatus, for a time shorter than normal by performing thinning display of the plurality of drawing frames at regular intervals during the period.

5. The information processing system according to claim 2, wherein
the low-speed display control displays the plurality of drawing frames on the first display screen after the transmission of the predetermined input data of the first information processing apparatus, for a time longer than normal by performing drawling display of the plurality of drawing frames after the transmission at an interval determined in advance, and
the high-speed display control displays the plurality of drawing frames on the second display screen after the reception of the predetermined input data of the first information processing apparatus, for a time shorter than normal by performing thinning display of the plurality of drawing frames after the reception at an interval determined in advance.

6. The information processing system according to claim 2, wherein
the first information processing apparatus and/or the second information processing apparatus is further configured to at least perform a delay time measurement to measure a delay time to be caused when the first information processing apparatus and the second information processing apparatus transmit and receive data to and from each other,
the low-speed display control displays the plurality of drawing frames on the first display screen after the transmission of the predetermined input data of the first information processing apparatus, for a time longer than normal on the basis of the delay time, and
the high-speed display control displays the plurality of drawing frames on the second display screen after the reception of the predetermined input data of the first information processing apparatus, for a time shorter than normal on the basis of the delay time.

7. The information processing system according to claim 6, wherein
the delay time measurement measures the delay time before the input data is transmitted and received,
after the transmission of the predetermined input data of the first information processing apparatus to the second information processing apparatus, the low-speed display control displays the plurality of drawing frames for a time longer than normal each time on the basis of the delay time measured before the input data is transmitted and received, and
after the second information processing apparatus has received the predetermined input data of the first information processing apparatus, the high-speed display control displays the plurality of drawing frames for a time shorter than normal each time on the basis of the delay time measured before the input data is transmitted and received.

8. The information processing system according to claim 6, wherein
if the delay time is equal to or greater than a predetermined time, the low-speed display control displays the plurality of drawing frames for a time longer than normal, and
if the delay time is equal to or greater than a predetermined time, the high-speed display control displays the plurality of drawing frames for a time shorter than normal.

9. The information processing system according to claim 2, wherein
the low-speed display control displays the plurality of drawing frames on the first display screen after the transmission of the predetermined input data of the first information processing apparatus, for a time longer than normal by performing drawling display of the plurality of drawing frames a predetermined number of times and at a predetermined interval after the transmission, and
the high-speed display control displays the plurality of drawing frames on the second display screen after the reception of the predetermined input data of the first information processing apparatus, for a time shorter than normal by performing thinning display of the plurality of drawing frames the predetermined number of times and at the predetermined interval after the reception.

10. The information processing system according to claim 2, wherein
the first input data transmission transmits the input data to the second information processing apparatus using long-distance communication via a network, and
the second input data reception receives the input data transmitted from the first information processing apparatus using long-distance communication via a network.

11. The information processing system according to claim 2, wherein
the first information processing apparatus is further configured to perform a first object action determination to, in accordance with a predetermined user input provided to the first information processing apparatus, determine an action to be taken by a predetermined object after the predetermined user input is provided,
the low-speed display control displays, for a time longer than normal, a plurality of drawing frames representing a successive action to be taken by the object after the predetermined user input is provided,
the second information processing apparatus further comprises a second object action determination configured to, in accordance with predetermined input data received from the first information processing apparatus, determine an action to be taken by the object after the predetermined input data is received, and
the high-speed display control displays, for a time shorter than normal, a plurality of drawing frames representing a successive action to be taken by the object after the predetermined input data is received.

12. The information processing system according to claim 11, wherein
if the reception of the predetermined input data has been delayed, the second object action determination temporarily stops the action of the object, and waits for the reception of the predetermined input data, thereby determining an action to be taken by the object after the reception of the predetermined input data.

13. An information processing system including at least a first information processing apparatus and a second information processing apparatus capable of communicating, with the first information processing apparatus,
the first information processing apparatus comprising a first processor and being configured to at least perform:
a first input acquisition to acquire a user input provided to the first information processing apparatus;
a first image display control to display on a first display screen an image based on the user input; and
a first input data transmission to transmit, to the second information processing apparatus, input data representing the user input,
the second information processing apparatus comprising a second processor and being configured to at least perform:
a second input data reception to receive the input data transmitted from the first information processing apparatus; and
a second image display control to display on a second display screen an image based on the input data received by the second input data reception, wherein
the first image display control includes a low-speed display control to display, for a time longer than normal, a plurality of drawing frames forming images that are to be displayed after transmission of predetermined input data and are based on the user input, and/or
the second image display control includes a high-speed display control to display, for a time shorter than normal, a plurality of drawing frames forming images that are to be displayed after reception of the predetermined input data and are based on the input data, and
the low-speed display control includes a performance of a drawling display of the plurality of drawing frames, thereby displaying the plurality of drawing frames for a time longer than normal.

14. The information processing system according to claim 13, wherein
the low-speed display control includes a performance of the drawling display by duplicating at least one of the plurality of drawing frames at a different time.

15. An information processing system including at least a first information processing apparatus and a second information processing apparatus capable of communicating with the first information processing apparatus,
the first information processing apparatus comprising a first processor and being configured to at least perform:
a first input acquisition to acquire a user input provided to the first information processing apparatus;
a first image display control to display on a first display screen an image based on the user input; and
a first input data transmission to transmit, to the second information processing apparatus, input data representing the user input,
the second information processing apparatus comprising a second processor and being configured to at least perform:
a second input data reception to receive the input data transmitted from the first information processing apparatus; and
a second image display control to display on a second display screen an image based on the input data received by the second input data reception, wherein
the first image display control includes a low-speed display control to display, for a time longer than normal, a plurality of drawing frames forming images that are to be displayed after transmission of predetermined input data and are based on the user input, and/or
the second image display control includes a high-speed display control to display, for a time shorter than normal, a plurality of drawing frames forming images that are to be displayed after reception of the predetermined input data and are based on the input data, and
the high-speed display control includes a performance of a thinning display of the plurality of drawing frames, thereby displaying the plurality of drawing frames for a time shorter than normal.

16. The information processing system according to claim 15, wherein
the high-speed display control includes a performance of a the thinning display by dropping at least one of the plurality of drawing frames.

17. An information processing apparatus capable of communicating with another information processing apparatus, the information processing apparatus comprising:
an input acquisition to acquire a user input;
an input data transmission to transmit, to the other information processing apparatus, input data representing the user input;
an input data reception to receive input data transmitted from the other information processing apparatus; and an image display control to display on a display screen an image based on the user input and an image based on the input data received by the input data reception unit, the image display control including:
    a low-speed display control to display, for a time longer than normal, a plurality of drawing frames forming images that are to be displayed after transmission of predetermined input data and are based on the user input.

18. The information processing apparatus according to claim 17, wherein the image display control further includes a high-speed display control to display, for a time shorter than normal, a plurality of drawing frames forming images that are to be displayed after reception of predetermined input data and are based on the input data received by the input data reception.

19. A non-transitory computer-readable storage medium having stored therein an information processing program to be executed by a computer included in an information processing apparatus capable of communicating with another information processing apparatus, the information processing program causing the computer to execute:
    acquiring a user input;
    transmitting, to the other information processing apparatus, input data representing the user input;
    receiving input data transmitted from the other information processing apparatus; and
    displaying on a display screen an image based on the user input and an image based on the received input data, the display of the images including:
        displaying, for a time longer than normal, a plurality of drawing frames forming images that are to be displayed after transmission of predetermined input data and are based on the user input.

20. The non-transitory computer-readable storage medium according to claim 19, wherein the display of the images further includes displaying, for a time shorter than normal, a plurality of drawing frames forming images that are to be displayed after reception of predetermined input data and are based on the received input data.

21. An information processing method to be executed by a processor or a cooperation of a plurality of processors, the processor or the plurality of processors contained in a system including at least one apparatus capable of communicating with another apparatus, the information processing method comprising:
    acquiring a user input;
    transmitting, to the other apparatus, input data representing the user input;
    receiving input data transmitted from the other apparatus; and
    displaying on a display screen an image based on the user input and an image based on the received input data, the display of the images including:
        displaying, for a time longer than normal, a plurality of drawing frames forming images that are to be displayed after transmission of predetermined input data and are based on the user input.

22. The information processing method to according to claim 21, wherein the display of the images further includes displaying, for a time shorter than normal, a plurality of drawing frames forming images that are to be displayed after reception of predetermined input data and are based on the received input data.

23. An information processing apparatus capable of communicating with another information processing apparatus, the information processing apparatus comprising:
    an input acquisition to acquire a user input;
    an input data transmission to transmit, to the other information processing apparatus, input data representing the user input;
    an input data reception to receive input data transmitted from the other information processing apparatus; and
    an image display control to display on a display screen an image based on the user input and an image based on the input data received by the input data reception, the image display control including:
        a low-speed display control to display, for a time longer than normal, a plurality of drawing frames forming images that are to be displayed after transmission of predetermined input data and are based on the user input; and/or
        a high-speed display control to display, for a time shorter than normal, a plurality of drawing frames forming images that are to be displayed after reception of predetermined input data and are based on the input data received by the input data reception; and
        the low-speed display control includes a performance of a drawling display of the plurality of drawing frames, thereby displaying the plurality of drawing frames for a time longer than normal.

24. A non-transitory computer-readable storage medium having stored therein an information processing program to be executed by a computer included in an information processing apparatus capable of communicating with another information processing apparatus, the information processing program causing the computer to execute:
    acquiring a user input;
    transmitting, to the other information processing apparatus, input data representing the user input;
    receiving input data transmitted from the other information processing apparatus; and
    displaying on a display screen an image based on the user input and an image based on the received input data, the display of the images including:
        displaying, for a time longer than normal, a plurality of drawing frames forming images that are to be displayed after transmission of predetermined input data and are based on the user input; and/or
        displaying, for a time shorter than normal, a plurality of drawing frames forming images that are to be displayed after reception of predetermined input data and are based on the received input data; and
        performing a drawling display of the plurality of drawing frames, thereby displaying the plurality of drawing frames for a time longer than normal.

25. An information processing method to be executed by a processor or a cooperation of a plurality of processors, the processor or the plurality of processors contained in a system including at least one apparatus capable of communicating with another apparatus, the information processing method comprising:
    acquiring a user input;
    transmitting, to the other apparatus, input data representing the user input;
    receiving input data transmitted from the other apparatus; and
    displaying on a display screen an image based on the user input and an image based on the received input data, the display of the images including:
        displaying, for a time longer than normal, a plurality of drawing frames forming images that are to be displayed after transmission of predetermined input data and are based on the user input; and/or displaying, for a time shorter than normal, a plurality of drawing frames forming images that are to be displayed after reception of predetermined input data and are based on the received input data; and performing a drawling display of the plurality of drawing frames, thereby displaying the plurality of drawing frames for a time longer than normal.

26. An information processing apparatus capable of communicating with another information processing apparatus, the information processing apparatus comprising:

an input acquisition to acquire a user input;

an input data transmission to transmit, to the other information processing apparatus, input data representing the user input;

an input data reception to receive input data transmitted from the other information processing apparatus; and an image display control to display on a display screen an image based on the user input and an image based on the input data received by the input data reception, the image display control including:

a low-speed display control to display, for a time longer than normal, a plurality of drawing frames forming images that are to be displayed after transmission of predetermined input data and are based on the user input; and/or a high-speed display control to display, for a time shorter than normal, a plurality of drawing frames forming images that are to be displayed after reception of predetermined input data and are based on the input data received by the input data reception; wherein the high-speed display control includes a performance of a thinning display of the plurality of drawing frames, thereby displaying the plurality of drawing frames for a time shorter than normal.

27. A non-transitory computer-readable storage medium having stored therein an information processing program to be executed by a computer included in an information processing apparatus capable of communicating with another information processing apparatus, the information processing program causing the computer to execute:

acquiring a user input;

transmitting, to the other information processing apparatus, input data representing the user input;

receiving input data transmitted from the other information processing apparatus; and displaying on a display screen an image based on the user input and an image based on the received input data, the display of the images including:

displaying, for a time longer than normal, a plurality of drawing frames forming images that are to be displayed after transmission of predetermined input data and are based on the user input; and/or displaying, for a time shorter than normal, a plurality of drawing frames forming images that are to be displayed after reception of predetermined input data and are based on the received input data; and performing thinning display of the plurality of drawing frames, thereby displaying the plurality of drawing frames for a time shorter than normal.

28. An information processing method to be executed by a processor or a cooperation of a plurality of processors, the processor or the plurality of processors contained in a system including at least one apparatus capable of communicating with another apparatus, the information processing method comprising:

acquiring a user input;

transmitting, to the other apparatus, input data representing the user input;

receiving input data transmitted from the other apparatus; and displaying on a display screen an image based on the user input and an image based on the received input data, the display of the images including:

displaying, for a time longer than normal, a plurality of drawing frames forming images that are to be displayed after transmission of predetermined input data and are based on the user input; and/or displaying, for a time shorter than normal, a plurality of drawing frames forming images that are to be displayed after reception of predetermined input data and are based on the received input data; and performing thinning display of the plurality of drawing frames, thereby displaying the plurality of drawing frames for a time shorter than normal.

* * * * *